United States Patent [19]

Sharp et al.

[11] Patent Number: 5,692,031
[45] Date of Patent: Nov. 25, 1997

[54] METHOD FOR CONFIGURING A BASE STATION

[75] Inventors: Ronald Edward Sharp; Prashanth Makonahalli Lakshman Gowda; Baheerathan son of Rajalingam; Ng See Woon, all of Singapore, Singapore

[73] Assignee: Motorola, Inc., Schaumburg, Ill.

[21] Appl. No.: 275,224

[22] Filed: Jul. 14, 1994

[51] Int. Cl.[6] .............................. H04M 11/00; H04Q 7/00
[52] U.S. Cl. .................... 379/58; 379/61; 379/34
[58] Field of Search ...................... 379/58, 59, 61, 379/60, 27, 34, 21, 57, 62; 455/33.1, 33.2, 54.1, 56.1

[56] References Cited

U.S. PATENT DOCUMENTS

| | | |
|---|---|---|
| 4,764,949 | 8/1988 | Faith et al. ............................. 379/27 |
| 5,265,150 | 11/1993 | Helmkamp et al. ..................... 379/58 |
| 5,398,279 | 3/1995 | Frain ........................................ 379/140 |
| 5,422,930 | 6/1995 | McDonald et al. ..................... 455/33.1 |
| 5,463,672 | 10/1995 | Kage ......................................... 379/57 |
| 5,530,945 | 6/1996 | Chavez, Jr. et al. ..................... 379/62 |
| 5,537,610 | 7/1996 | Mauger et al. ............................ 379/58 |

*Primary Examiner*—Dwayne Bost
*Assistant Examiner*—Scott Richardson
*Attorney, Agent, or Firm*—Daniel R. Callopy

[57] ABSTRACT

Configuring a telepoint base station 101 having base station channels 105, 110 and 115 that are coupled to a public switched telephone network 103 via subscriber channels 120, 125 and 130 by, determining the subscriber channel IDs affiliated with the subscriber channels 120, 125 and 130, and storing the subscriber channels IDs in memory 102. Subsequently, using the subscriber channel IDs to determine which of the subscriber channel IDs 120, 125 and 130 is a group ID for the telepoint base station, and storing the group ID.

4 Claims, 2 Drawing Sheets

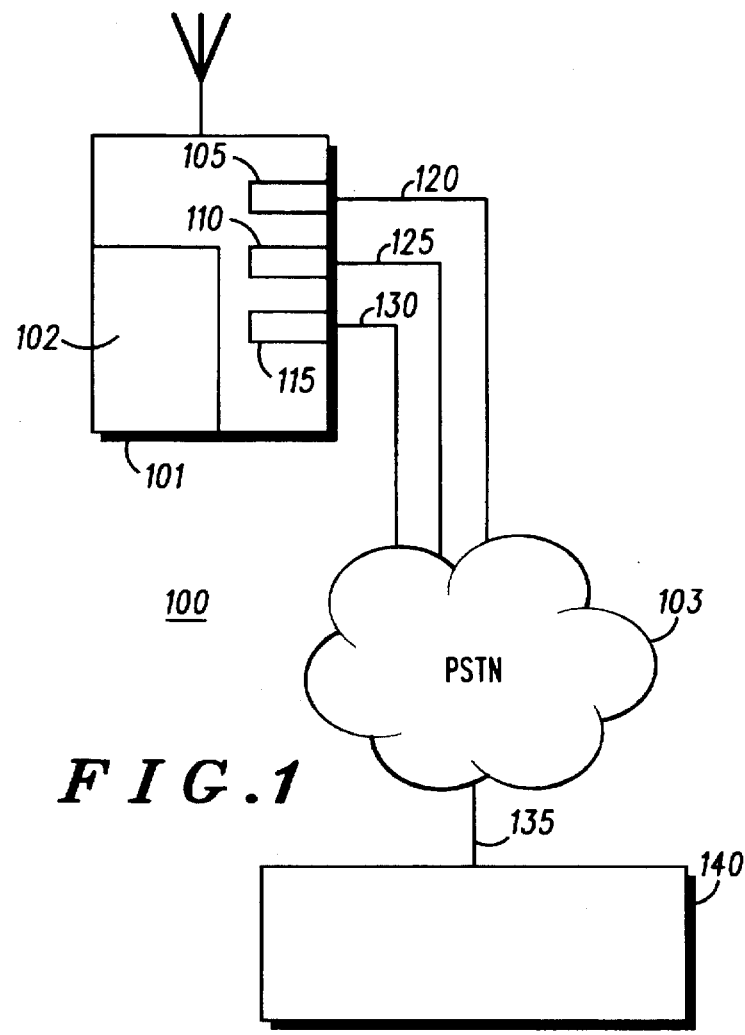

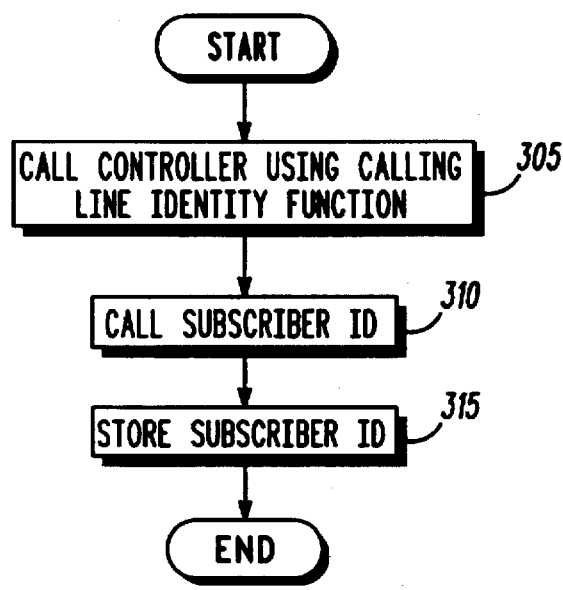
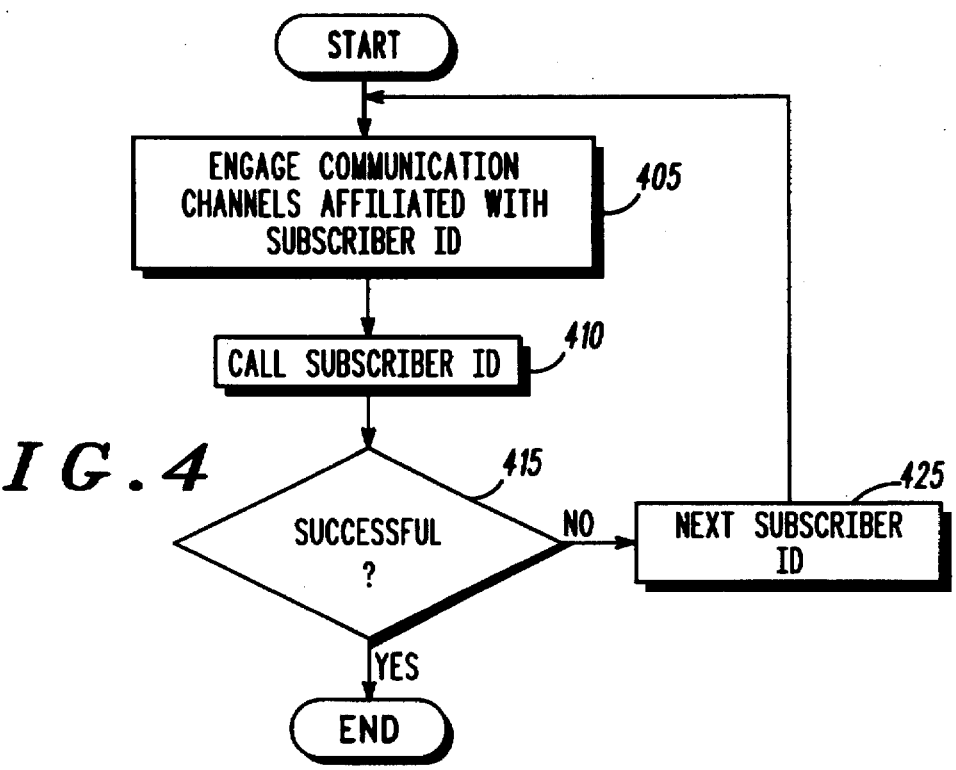

METHOD FOR CONFIGURING A BASE STATION

FIELD OF THE INVENTION

This invention relates in general to communication systems, and in particular to communication systems coupled to a public switched telephone network.

BACKGROUND OF THE INVENTION

Second generation cordless telephone (CT2) communication systems that utilise available public switched telephone network (PSTN) infrastructure to provide cellular-like wireless communication services are known in the art. A typical CT2 communication system comprises a plurality of portable communication units and a variety of equipment that are coupled to the PSTN. This equipment includes a mobility management system (MMS) and a plurality of telepoint base stations (TBS). A TBS is connected to the PSTN via one or more basic rate interfaces (BRI). In accordance with the integrated services digital network (ISDN) standards, a BRI is assigned a telephone number by the PSTN and supports two voice calls between the TBS and the PSTN simultaneously. When more than one BRI is connected to a TBS, one of the telephone numbers of the BRIs assigned to the TBS is also assigned, at the PSTN, as a group number for the TBS. The group number performs the function of a hunting line, hence, when a TBS is called using the group number the call may be received by the TBS on any one of the BRIs assigned to the TBS.

Configuring a TBS in a CT2 communication system requires a substantial number of manual processes to program pre-assigned BRI telephone numbers and a group telephone number into the TBS and the MMS, respectively. For example, when installing a TBS with 3 BRI lines at a particular location, a technician at the location performs the following steps: call an operator at the telephone exchange on each BRI line to determine from the telephone operator, the telephone number of each line and, which of these telephone numbers is also assigned as the group number for the TBS; connecting each telephone line to a an input on the TBS; using a personal computer coupled to the TBS, running a TBS interface software to program the telephone numbers into the non-volatile memory of the TBS such that the telephone numbers are correctly associated with the inputs to the TBS; and providing the operator at the MMS with the group telephone number which the operator at the MMS then programs into the MMS. This process is repeated for each TBS, and in a typical CT2 communication system with thousands of TBSs such manual processes are uneconomical, inefficient and prone to errors. Another disadvantage of this method is, when a TBS is replaced, great care must be exercised to ensure that the BRI lines with the correct telephone numbers are connected to the correct inputs of the replacement TBS. Yet another disadvantage of this method is that, when telephone numbers used by TBSs are changed by the PSTN operator, the manual configuration process has to be repeated at each TBS location affected by the change.

Hence, a need exists for an economical, efficient and precise way to configure telepoint base stations, that is not dependent on manual configuration processes.

SUMMARY OF THE INVENTION

In carrying out the objects of the present invention in one form, there is provided a method for automatically configuring a telepoint base station that allows the telepoint base station to determine the particular telephone numbers of each basic rate interface connected to the telepoint base station inputs. In addition this method allows the telepoint base station to also determine which of the telephone numbers assigned to the telepoint base station is the group telephone number, and providing the group telephone number to a mobility management system.

BRIEF DESCRIPTION OF THE DRAWING

FIG. 1 illustrates a block diagram of the preferred embodiment of the present invention.

FIG. 2 illustrates a table detailing the information stored at a base station of the preferred embodiment of the present invention.

FIG. 3 illustrates a flowchart detailing the operation in accordance with the preferred embodiment of the present invention.

FIG. 4 illustrates a flowchart detailing the operation in accordance with the preferred embodiment of the present invention.

DETAILED DESCRIPTION OF THE INVENTION

FIG. 1 illustrates a block diagram of a communication system 100 comprising a telepoint base station (TBS) 101, a controller 140 and a public switched telephone network (PSTN) 103. A communication channel 135 couples the controller 140 to the PSTN 103, and subscriber channels 120, 125 and 130 couple the TBS 101 to the PSTN 103. Conventionally, the PSTN comprises an Integrated Services Digital Network (ISDN). Using ISDN, each of the subscriber channels 120, 125 and 130 may be a Basic Rate Interface (BRI) that provides two communication channels and a control channel, while, the communication channel 135 may include a SS7 link and a BRI, where conventionally the SS7 link communicates control information.

The TBS 101 supports base station channels 105, 110 and 115 which couple to subscriber channels 120, 125 and 130 respectively. The TBS 101 is also provided with a memory 102 in which configuration information may be stored. The memory 102 may include semiconductor memory devices, for example, RAM, ROM, EPROM, and may also include other storage media. FIG. 2 illustrates a table 102 detailing the configuration information that may be stored in the memory 102. Typically, the information in the base station channel identifier (ID) column 205 is pre-assigned in the TBS 101. For example, base station channel identifiers (IDs) 1, 2, and 3 may be pre-assigned to base station channels 105, 110, and 115 respectively, when manufacturing the TBS 101. However, information in the subscriber channel ID column 205, and group ID column 210, is available and may be configured in the TBS 101, only after the TBS 101 is coupled to the subscriber channels 120, 125, and 130. For example, the configuration of TBS 101, from the contents of table 102, indicates that base station channel IDs no. 1, 2 and 3 are affiliated with subscriber channel IDs no. 123-4567, 123-1675 and 123-1721, respectively; and that the subscriber channel ID no. 123-4567 is also the group ID of subscriber channel IDs 123-4567, 123-1675 and 123-1721.

During installation of a TBS at a predetermined location, the subscriber channels are coupled to the TBS, and the TBS is subsequently configured. Configuring the TBS is a two step process. The first step determines subscriber channel IDs affiliated with the TBS, and the second step uses these subscriber IDs to determine which of the subscriber channel IDs is the group ID for the TBS.

FIG. 3 illustrates a flowchart detailing a method for determining subscriber channel IDs 210 affiliated with the TBS 101. Conventionally, the subscriber channel ID may also be referred to as the directory number (DN). The method begins when the TBS 101 calls 305 the controller 140 utilising a calling line identity (CLI) function on the base station channel 105. The PSTN 103 receives the call on the subscriber channel 120 and establishes the call with the controller 140. Subsequently, the PSTN 103 transmits the subscriber channel ID 123-4567 to the controller 140. The TBS 101 may use a subscriber channel ID affiliated with the controller 140 to call the controller 140, where the subscriber channel ID affiliated with the controller 140, may be stored in the memory 102. For example, the subscriber channel ID may be a telephone number assigned to the controller 140 and stored in the memory 102 at the TBS 101. The CLI function is provided by the PSTN 103 and is well known in the art, that provides a subscriber channel ID affiliated with a subscriber channel, when a call is made on the subscriber channel.

Upon receiving the subscriber channel ID 123-4567, the controller 140 uses the subscriber channel ID 123-4567 to call 310 the TBS 101, and transmits the subscriber channel ID 123-4567 to the TBS 101. In an ISDN system for example, a subscriber channel ID may be transmitted using an information element (IE), for example, a sub-address IE may be used. Upon receiving the subscriber channel ID 123-4567, the TBS 101 determines that the subscriber channel ID 123-4567 is affiliated with the selected base station channel 105. Subsequently, the TBS 101 stores 315 the subscriber channel ID 123-4567 in the memory 102, such that, the affiliation between the base station channel ID 105 and the subscriber channel ID is maintained.

This method is repeated with each of other base station channels 110 and 115, and the affiliation with the subscriber channel IDs 123-1675, 123-1721, is determined and subsequently stored in the memory 102. Hence, with this method, no manual procedures are required at the TBS 101 or at the controller 140, which substantially improves the time taken to configure the TBS. As a result, no additional skills or equipment are required, significantly reducing the need for specially trained personnel and reducing the probability of human error.

The next step in configuring a TBS is determining which of the subscriber channel IDs affiliated with the TBS is a group ID. FIG. 4 illustrates a flow chart detailing a method of determining the group ID 215. Conventionally, a group ID may also be referred to as the roll over number, the pilot number or the hunting multi-line number. The method begins with engaging 405 each communication channel affiliated with a subscriber ID, for example, subscriber ID 123-4567. Typically, in an ISDN system for, two communication channels are affiliated with the subscriber channel ID 123-4567. One way of engaging the two communication channels is by calling the subscriber channel ID 123-4567 from the controller twice in succession. Alternatively, a loop back call may be made on the subscriber channel affiliated with the subscriber channel ID 123-4567, using the subscriber channel ID 123-4567. This causes a call to be made on one of the two communication channels and received on the other of the two communication channels affiliated with the subscriber channel ID 123-4567.

Having engaged the communication channels affiliated with the subscriber channel ID 123-4567, a subsequent call 410 is made to the subscriber channel ID 123-4567. This subsequent call may be made by the TBS 101 using another subscriber channel 125, 130 affiliated with the TBS 101. Alternatively, the call may be made by the controller 140. When the call to the subscriber channel 105 is not successful 415, the subscriber channel ID 123-4567 affiliated with subscriber channel 105 is not the group ID, and this method of determining the group ID is repeated 425 with the next subscriber channel ID 123-1675. When the subsequent call to the subscriber channel is successful 415, the subscriber channel ID 123-1675 is the group ID 215 for the TBS 101, and the subscriber channel ID 123-1675 is then stored 420 as the group ID 215 in the memory 102. Alternatively, an indication may be stored in the memory 102 to indicate that the subscriber ID 123-1675 is the group ID 215. Typically, the group ID 215 is provided to the controller 140 and is subsequently stored at the controller 140. With the present invention, the TBS 101 may communicate the group ID 215 to the controller 140 upon determining the group ID or when the TBS 101 is interrogated by the controller 140. This method allows the group ID 215 to be determined automatically and accurately, without any manual processes. As a result, when changes of subscriber channel IDs 210 are made at the PSTN 103 by the telephone company, any changes affecting the group IDs may be easily and quickly determined, and updated.

Presently, methods for determining subscriber channel IDs and a group ID affiliated with a TBS are totally manual and extremely tedious. These methods require a technician at a TBS location to communicate verbally with an operator at the telephone company, and another operator at the controller, to configure the TBS resulting in a high probability of human error. The present invention is totally automatic, hence, human error is eliminated.

In accordance with the present invention, no manual process or manual intervention is required to configure a TBS with subscriber channel IDs and group ID. In addition, the present invention allows the TBS to update any changes in subscriber channel assignments that may be made by the telephone company quickly and with minimal impact on the operation of the TBS.

Thus, it can be seen that the present invention provides an economical, efficient and precise way to configure telepoint base stations, which is not dependent on manual configuration processes. As telepoint communication systems conventionally include thousands of telepoint base stations, the present invention provides substantial savings in time and manpower resources, and in addition, provides the flexibility to easily, and efficiently, adapt to changes in subscriber channel IDs that may be made by a telephone company.

What is claimed is:

1. A method for coupling a base station to a public switched telephone network (PSTN), wherein the base station has a base station channel therein, and wherein the base station channel has a base station channel identifier (ID) affiliated therewith, the method comprising the steps of:

a) coupling the base station channel of the base station to a subscriber channel of the PSTN, wherein the subscriber channel has a subscriber channel identifier (ID) affiliated therewith;

b) calling a controller on the base station channel employing a calling line identity function of the PSTN to provide the subscriber channel ID to the controller;

c) in response to the call in step (b), receiving a call from the controller via the base station channel, wherein the call from the controller provides the subscriber channel ID to the base station; and d) upon receiving the subscriber channel ID, storing the subscriber channel ID with the base station channel ID at the base station, thereby affiliating the base station channel ID and the subscriber channel ID.

2. The method of claim 1 wherein step (b) comprises the step of calling the controller using a controller channel ID affiliated with the controller, wherein the controller ID is pre-stored at the base station.

3. The method of claim 1 wherein the base station channel comprises a telephone line, wherein step (b) comprises the step of calling the controller on the telephone line employing the calling line identity function, wherein the calling line identity function provides the subscriber channel ID to the controller.

4. The method of claim 1 wherein the base station channel comprises a communications port of the base station, wherein step (b) comprises the step of calling the controller on the communications port employing the calling line identity function, wherein the calling line identity function provides the subscriber channel ID to the controller.

* * * * *